United States Patent
Fang et al.

(10) Patent No.: US 9,148,654 B2
(45) Date of Patent: Sep. 29, 2015

(54) FIELD SEQUENTIAL COLOR LCD AND METHOD FOR GENERATING 3D IMAGES BY MATCHING A SOFTWARE OPTICAL GRATING

(71) Applicant: C VISION TECHNOLOGY CO., LTD., Shenzhen, Guangdong (CN)

(72) Inventors: Tsung-Yau Fang, Tao Yun (TW); Ching-Te Shih, Kaohsiung (TW)

(73) Assignee: C VISION TECHNOLOGY CO., LTD., Shenzhen, Guangdong (CN)

( * ) Notice: Subject to any disclaimer, the term of this patent is extended or adjusted under 35 U.S.C. 154(b) by 83 days.

(21) Appl. No.: 14/096,564

(22) Filed: Dec. 4, 2013

(65) Prior Publication Data

US 2015/0015568 A1    Jan. 15, 2015

(30) Foreign Application Priority Data

Jul. 12, 2013 (TW) .............................. 102125090 A

(51) Int. Cl.
  *G06T 15/00* (2011.01)
  *H04N 13/04* (2006.01)

(52) U.S. Cl.
  CPC ............ *H04N 13/0409* (2013.01); *G06T 15/00* (2013.01)

(58) Field of Classification Search
  CPC ..... H04N 13/0409; H04N 13/04; G06T 15/00
  USPC ................ 345/419, 102; 348/51, 55, 59, 564; 349/15
  See application file for complete search history.

(56) References Cited

U.S. PATENT DOCUMENTS

| | | | | |
|---|---|---|---|---|
| 8,049,710 | B2* | 11/2011 | Shestak et al. | 345/102 |
| 8,139,024 | B2* | 3/2012 | Daiku | 345/102 |
| 8,687,042 | B2* | 4/2014 | Karaoguz et al. | 348/42 |
| 9,019,263 | B2* | 4/2015 | Bennett et al. | 345/419 |
| 2011/0157172 | A1* | 6/2011 | Bennett et al. | 345/419 |

FOREIGN PATENT DOCUMENTS

| | | | |
|---|---|---|---|
| CN | 102628997 A | | 8/2012 |
| EP | 1 662 808 | * | 5/2006 |
| TW | 200720797 A | | 6/2007 |
| TW | 200801598 A | | 1/2008 |
| TW | 201018992 A | | 5/2010 |
| TW | 201335623 A1 | | 9/2013 |
| WO | WO 2005/045488 | * | 5/2005 |
| WO | WO 2007/024118 | * | 3/2007 |

* cited by examiner

*Primary Examiner* — Phu K Nguyen
(74) *Attorney, Agent, or Firm* — Li & Cai Intellectual Property (USA) Office

(57) ABSTRACT

A field sequential color LCD for generating 3D images by matching a software optical grating includes a backlight module and a LCD panel. The LCD panel has a plurality of first subpixels for generating a first image, a plurality of second subpixels for generating a second image, and a plurality of third subpixels for generating a black barrier image as the software optical grating. When the black barrier image is slightly spread to cover one part of the first image and one part of the second image, the first image is covered partially by the black barrier image to form a right-eye image, and the second image is covered partially by the black barrier image to form a left-eye image. Whereby, the right-eye and the left-eye images concurrently generated by the field sequential color LCD are respectively projected onto the right and the left eyes of the viewer.

16 Claims, 7 Drawing Sheets

FIELD SEQUENTIAL COLOR LCD AND METHOD FOR GENERATING 3D IMAGES BY MATCHING A SOFTWARE OPTICAL GRATING

BACKGROUND OF THE INVENTION

1. Field of the Invention

The instant disclosure relates to a field sequential color LCD and a method for generating 3D images, and more particularly to a field sequential color LCD and a method for generating 3D images by matching a software optical grating.

2. Description of Related Art

Generally, stereoscopic images with three-dimensional (3D) effects are possible based on the theory of stereo-eyesight by both eyes. An important factor for a three dimensional effect is the difference in optical angles of a person's two eyes, due to a distance of 65 mm therebetween, i.e., a parallax of the eyes. That is, each of the eyes respectively sees two different two-dimensional images, and when said two images are transferred via retina to the brain, the brain combines said transferred two images and reproduces the original three-dimensional image with sense of depth and sense of reality. This is generally referred to stereography.

A stereoscopic image display apparatus is classified into two generic types based on whether a user should wear a specific pair of glasses or not: a glasses-type of stereoscopic image display apparatus (stereoscopic image display apparatus) and a non-glasses-type of stereoscopic image display apparatus (auto-stereoscopic image display apparatus). The stereoscopic image display apparatus gives a watcher inconvenience of wearing special glasses, while the auto-stereoscopic image display apparatus allows a watcher to enjoy three-dimensional images only by directly watching the screen even without wearing said glasses, and thereby the auto-stereoscopic image display apparatus solves problems with the stereoscopic image display apparatus. Therefore, there are many studies on the auto-stereoscopic image display apparatus going on nowadays. The auto-stereoscopic image display apparatus again can be classified into two generic types: apparatus by the lenticular method and apparatus by the parallax-barrier method.

Operation of the stereoscopic image display apparatus by the conventional parallax-barrier method are explained as follows. The stereoscopic image display apparatus by the conventional parallax-barrier method comprises a display module, wherein the left image and the right image respectively corresponding to the left eye and the right eye face towards the vertical direction and are disposed alternately in the horizontal direction; and a blocking film in the form of a bar which is called a barrier, disposed at the front end and facing towards the vertical direction. This kind of stereoscopic image display apparatus has a system wherein said display module and barrier are disposed so as that the light for the left image goes only into the left eye, and the light for the right image goes only into the right eye, and thereby the divided two left and right images are separately observed to give the stereoscopic sense.

SUMMARY OF THE INVENTION

One aspect of the instant disclosure relates to a field sequential color LCD and a method for generating 3D images by matching a software optical grating.

One of the embodiments of the instant disclosure provides a field sequential color LCD for generating 3D images by matching a software optical grating, comprising: a backlight module for generating a light source and a LCD panel adjacent to the backlight module. The LCD panel includes a plurality of pixels adjacent to each other and arranged as a matrix, each pixel has a first subpixel, a second subpixel and a third subpixel, and the first subpixel, the second subpixel and the third subpixel of each pixel are arranged in sequence and adjacent to each other. Wherein, one part of the light source generated by the backlight module passes through the first subpixels of the pixels, thus the first subpixels of the pixels are mated with each other for generating a first image; another part of the light source generated by the backlight module passes through the second subpixels of the pixels, thus the second subpixels of the pixels are mated with each other for generating a second image; the other light source generated by the backlight module is shielded by a polarizing sheet of the LCD panel to limit the other light source to pass through the third subpixels of the pixels, thus the third subpixels of the pixels are mated with each other for generating a black barrier image as the software optical grating. Whereby, when the first image, the second image and the black barrier image are concurrently generated by the field sequential color LCD, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the field sequential color LCD and respectively projected onto a right eye and a left eye of a viewer.

More precisely, the first subpixels of the pixels are arranged to form a plurality of first vertical shapes, the second subpixels of the pixels are arranged to form a plurality of second vertical shapes, the third subpixels of the pixels are arranged to form a plurality of third vertical shapes, and the black barrier image is composed of the third vertical shapes. The first subpixel of each pixel is a leftmost subpixel of the pixel, the third subpixel of each pixel is a rightmost subpixel of the pixel, and the second subpixel of each pixel is a middle subpixel disposed between the first subpixel and the third subpixel. Alternatively, the black barrier image can be composed of a plurality of zigzag shapes or inclined shapes.

Another one of the embodiments of the instant disclosure provides a field sequential color LCD for generating 3D images by matching a software optical grating, comprising: a backlight module for generating a light source and a LCD panel adjacent to the backlight module. The LCD panel includes a plurality of first subpixels mated with each other for generating a first image, a plurality of second subpixels mated with each other for generating a second image, and a plurality of third subpixels mated with each other for generating a black barrier image as the software optical grating, and the first subpixels, the second subpixels and the third subpixels are arranged as a matrix. Whereby, when the first image, the second image and the black barrier image are concurrently generated by the field sequential color LCD, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the field sequential color LCD and respectively projected onto a right eye and a left eye of a viewer.

Yet another one of the embodiments of the instant disclosure provides a method for generating 3D images by matching a software optical grating, comprising: providing a field sequential color LCD including a backlight module for generating a light source and a LCD panel adjacent to the backlight module, wherein the LCD panel includes a plurality of pixels adjacent to each other and arranged as a matrix, each pixel has a first subpixel, a second subpixel and a third subpixel, and the first subpixel, the second subpixel and the third subpixel of each pixel are arranged in sequence and adjacent to each other; switching the field sequential color LCD to a 2D image display mode or a 3D image display mode, wherein when the field sequential color LCD is switched to the 3D image display mode, one part of the light source generated by the backlight module passes through the first subpixels for generating a first image, another part of the light source generated by the backlight module passes through the second subpixels for generating the second image, and the other light source generated by the backlight module is shielded by a polarizing sheet of the LCD panel to limit the other light source to pass through the third subpixels for generating a black barrier image as the software optical grating, wherein when the first image, the second image and the black barrier image are concurrently generated by the field sequential color LCD, the black barrier image is slightly spread to cover one part of the first image and one part of the second image; and then partially covering the first image by the black barrier image for generating a right-eye image, and partially covering the second image by the black barrier image for generating a left-eye image, wherein the right-eye image and the left-eye image are concurrently generated by the field sequential color LCD and respectively projected onto a right eye and a left eye of a viewer.

More precisely, when the field sequential color LCD is switched to the 2D image display mode, the light source generated by the field sequential color LCD concurrently passes through the first subpixels, the second subpixels and the third subpixels, thus the first subpixels, the second subpixels and the third subpixels are mated with each other for generating a 2D image.

Therefore, the black barrier image can be slightly and outwardly spread to cover one part of the first image and one part of the second image, thus the first image is covered partially by the black barrier image for generating a right-eye image, and the second image is covered partially by the black barrier image for generating a left-eye image. Whereby, when the right-eye image and the left-eye image are concurrently generated by the field sequential color LCD, the right-eye image and the left-eye image can be respectively projected onto the right eye and the left eye of the viewer, thus the field sequential color LCD can provide 3D images for the viewer.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Referring to FIG. 1 to FIG. 5, where the first embodiment of the instant disclosure provides a field sequential color LCD (Liquid Crystal Display) Z for generating 3D images by matching a software optical grating, comprising: a backlight module 1 for generating a light source and a LCD panel 2 adjacent to the backlight module 1.

Figure 1:
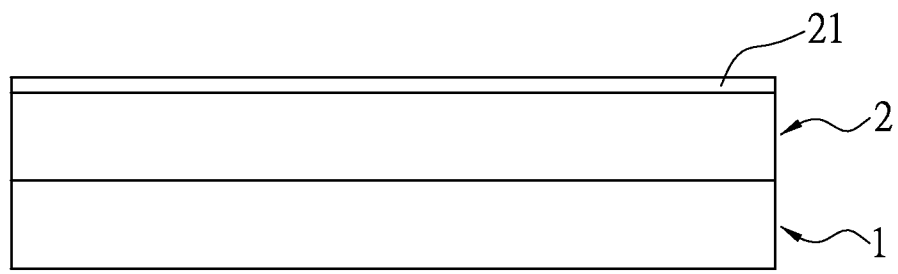
FIG. 1 shows a schematic view of the field sequential color LCD according to the first embodiment of the instant disclosure.
Figure 2:
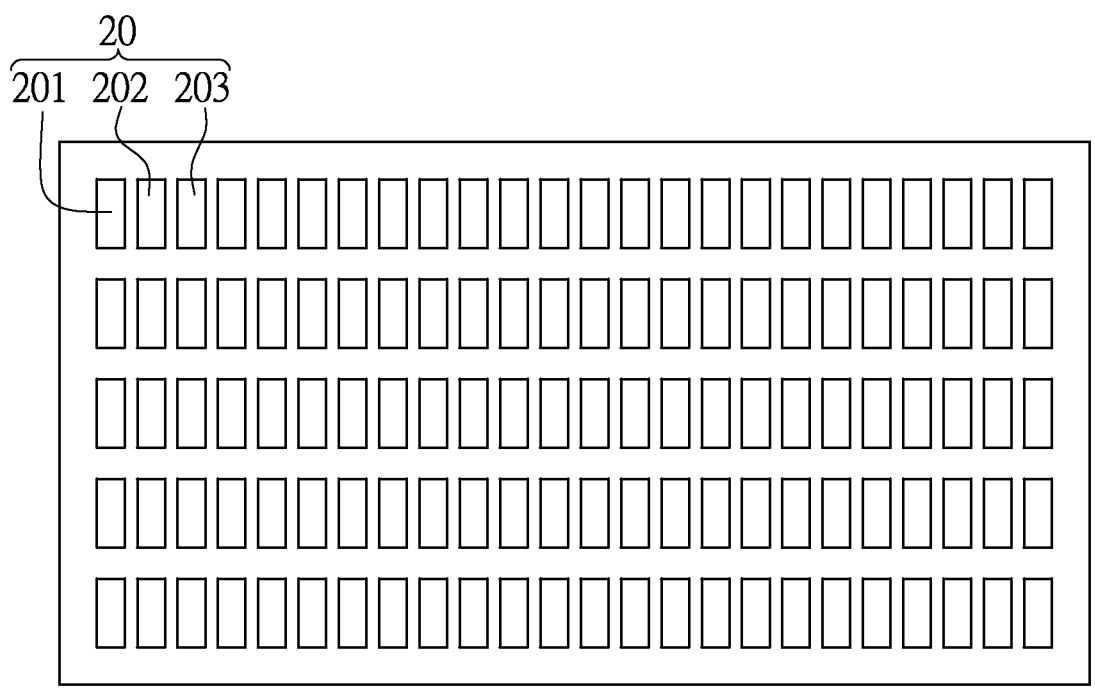
FIG. 2 shows a schematic view of the field sequential color LCD including a LCD panel having a plurality of pixels according to the first embodiment of the instant disclosure.

First, referring to FIG. 1 and FIG. 2, the backlight module 1 includes a plurality of light-emitting diodes (not shown) arranged on the PCB to sequentially generate red, green and blue planar light sources. The LCD panel 2 is adjacent to the backlight module 1 (such as the LCD panel 2 is disposed on the backlight module 1) to sequentially receive the red, green and blue planar light sources. Referring to FIG. 2, the LCD panel 2 includes a plurality of pixels 20 adjacent to each other and arranged as a matrix, each pixel 20 has a first subpixel 201, a second subpixel 202 and a third subpixel 203, and the first subpixel 201, the second subpixel 202 and the third subpixel 203 of each pixel 20 are arranged in sequence and adjacent to each other. For example, the first subpixels 201 of the pixels 20 are arranged to form a plurality of first vertical shapes, the second subpixels 202 of the pixels 20 are arranged to form a plurality of second vertical shapes, and the third subpixels 203 of the pixels 20 are arranged to form a plurality of third vertical shapes. More precisely, the first subpixel 201 of each pixel 20 is a leftmost subpixel of the pixel 20, the third subpixel 203 of each pixel 20 is a rightmost subpixel of the pixel 20, and the second subpixel 202 of each pixel 20 is a middle subpixel disposed between the first subpixel 201 and the third subpixel 203. However, the above-mentioned arrangement for the first subpixel 201, the second subpixel 202 and the third subpixel 203 of each pixel 20 in the first embodiment is merely an example and is not meant to limit the instant disclosure.

Figure 3:
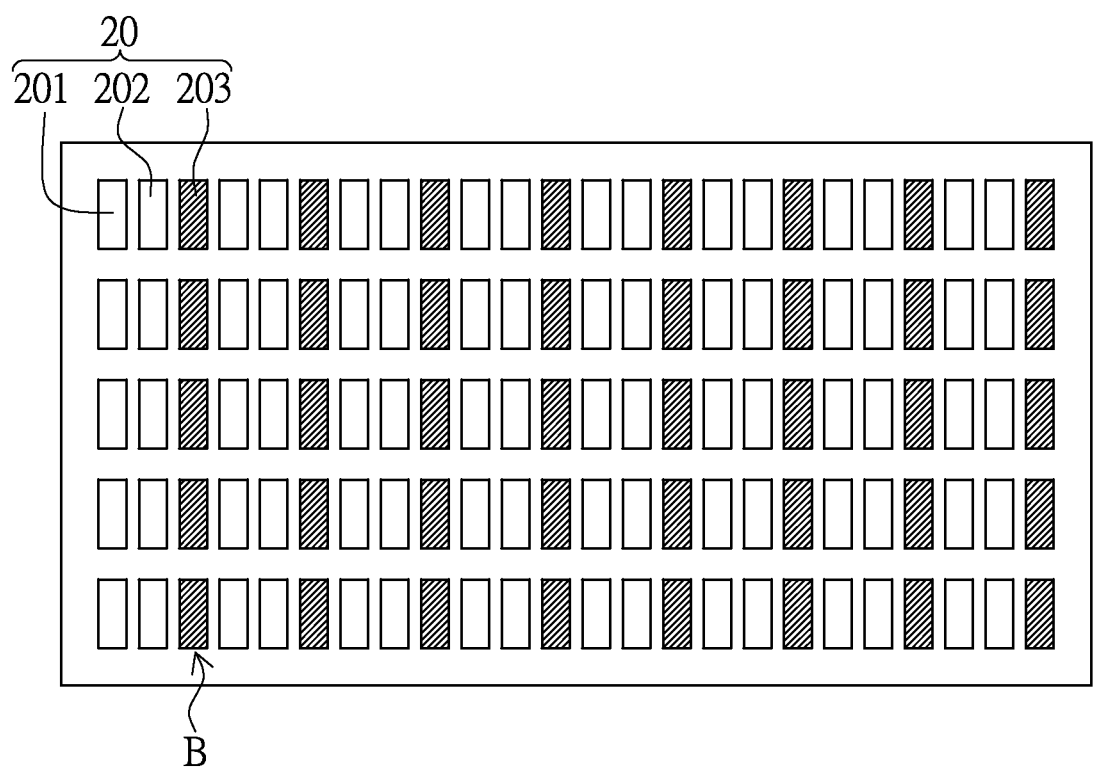
FIG. 3 shows a schematic view of the field sequential color LCD including a LCD panel having a plurality of third subpixels arranged as a black barrier image composed of many third vertical shapes according to the first embodiment of the instant disclosure.
Figure 4:
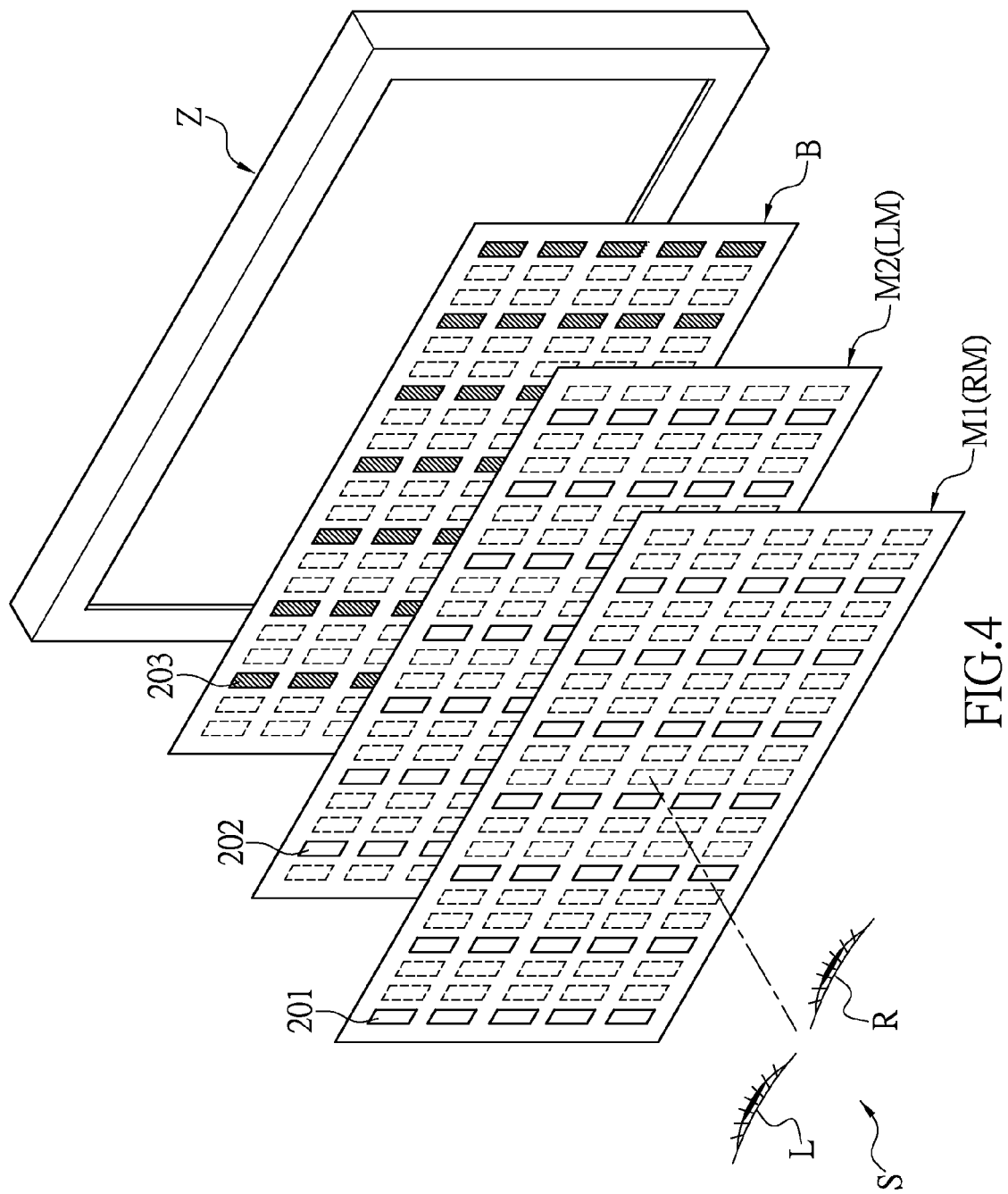
FIG. 4 shows a perspective, schematic view of the field sequential color LCD for concurrently generating the first image (the right-eye image), the second image (the left-eye image) and the black barrier image according to the first embodiment of the instant disclosure.
Figure 5:
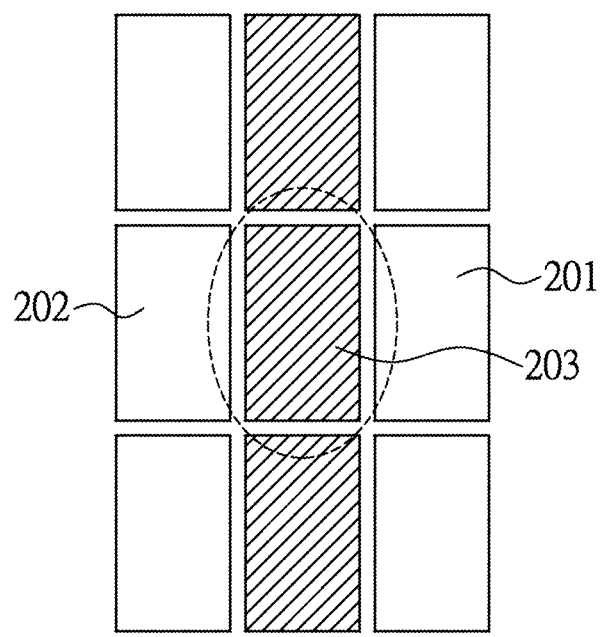
FIG. 5 shows a schematic view of the black barrier image slightly and outwardly spread to cover one part of the first image and one part of the second image according to the first embodiment of the instant disclosure.

Moreover, referring to FIG. 3, FIG. 4 and FIG. 5, one part of the light source generated by the backlight module 1 passes through the first subpixels 201 of the pixels 20, thus the first subpixels 201 of the pixels 20 are mated with each other for generating a first image M1. Another part of the light source generated by the backlight module 1 passes through the second subpixels 202 of the pixels 20, thus the second subpixels 202 of the pixels 20 are mated with each other for generating a second image M2. The other light source generated by the backlight module 1 is shielded by a polarizing sheet 21 of the LCD panel 2 to limit the other light source to pass through the third subpixels 203 of the pixels 20 (i.e., the other light source generated by the backlight module 1 is shielded by the polarizing sheet 21 of the LCD panel 2, so that the other light source generated by the backlight module 1 cannot pass through the third subpixels 203 of the pixels 20), thus the third subpixels 203 of the pixels 20 are mated with each other for generating a black barrier image B (such as a black barrier area composed of the third vertical shapes) as the software optical grating. In other words, referring to FIG. 3 and FIG. 4, the LCD panel 2 includes a plurality of first subpixels 201 mated with each other for generating a first image M1, a plurality of second subpixels 202 mated with each other for generating a second image M2, and a plurality of third subpixels 203 mated with each other for generating a black barrier image B as the software optical grating, and the first subpixels 201, the second subpixels 202 and the third subpixels 203 are arranged as a matrix.

For example, according to different designs for the polarizing sheet 21, when the voltage is provided for the LCD panel 2, the liquid-crystal molecules inside the LCD panel 2 cannot be deflected, thus the light source generated by the backlight module 1 cannot pass through the polarizing sheet 21 of the LCD panel 2, and then the third subpixels 203 of the pixels 20 can be mated with each other for generating the black barrier image B as the software optical grating. Alternatively, when the voltage is provided for the LCD panel 2, the liquid-crystal molecules inside the LCD panel 2 can be deflected by 90 degrees, thus the light source generated by the backlight module 1 cannot pass through the polarizing sheet 21 of the LCD panel 2, and then the third subpixels 203 of the pixels 20 can be mated with each other for generating the black barrier image B as the software optical grating.

More precisely, referring to FIG. 4 and FIG. 5, when the first image M1, the second image M2 and the black barrier image B are concurrently generated by the field sequential color LCD Z and are overlapping, the black barrier image B is slightly and outwardly spread to form an outward diffusion region surrounded by the dotted line area as shown in FIG. 5 for covering one part of the first image M1 (such as one part of each first subpixel 201) and one part of the second image M2 (such as one part of each second subpixel 202). Whereby, the first image M1 can be covered partially by the black barrier image B for generating a right-eye image RM, the second image M2 can be covered partially by the black barrier image B for generating a left-eye image LM, and the right-eye image RM and the left-eye image LM can be concurrently generated by the field sequential color LCD Z and respectively projected onto a right eye R and a left eye M of a viewer S, thus the field sequential color LCD Z can provide 3D images for the viewer S.

Figure 6:
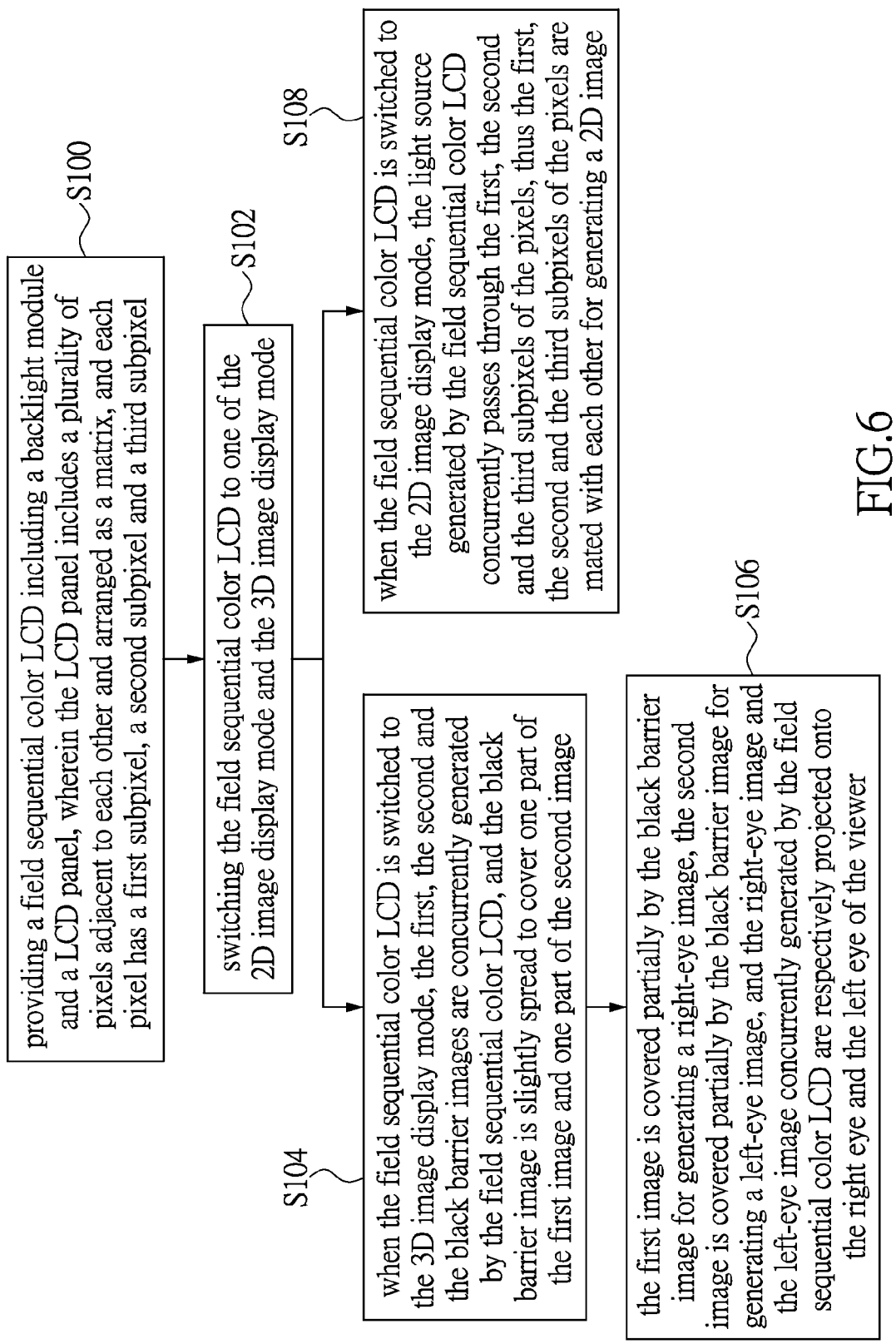
FIG. 6 shows a flow chart of the method for generating 3D images by matching a software optical grating according to the first embodiment of the instant disclosure.

Furthermore, referring to FIG. 6, where the first embodiment of the instant disclosure provides a method for generating 3D images by matching a software optical grating, comprising the following steps:

First, the step S100 is that: referring to FIG. 1, FIG. 2 and FIG. 6, providing a field sequential color LCD Z including a backlight module 1 for generating a light source and a LCD panel 2 adjacent to the backlight module 1, wherein the LCD panel 2 includes a plurality of pixels 20 adjacent to each other and arranged as a matrix, each pixel 20 has a first subpixel 201, a second subpixel 202 and a third subpixel 203, and the first subpixel 201, the second subpixel 202 and the third subpixel 203 of each pixel 20 are arranged in sequence and adjacent to each other.

Next, the step S102 is that: referring to FIG. 1 and FIG. 6, switching the field sequential color LCD Z to a 2D image display mode or a 3D image display mode.

Afterward, the step S104 is that: referring to FIG. 3, FIG. 4, FIG. 5 and FIG. 6, when the field sequential color LCD Z is switched to the 3D image display mode, one part of the light source generated by the backlight module 1 passes through the first subpixels 201 of the pixels 20 for generating a first image M1, another part of the light source generated by the backlight module 1 passes through the second subpixels 202 of the pixels 20 for generating the second image M2, and the other light source generated by the backlight module 1 is shielded by a polarizing sheet 21 of the LCD panel 2 to limit the other light source to pass through the third subpixels 203 of the pixels 20 for generating the black barrier image B as the software optical grating. More precisely, when the first image M1, the second image M2 and the black barrier image B are concurrently generated by the field sequential color LCD Z, the black barrier image B is slightly spread to cover one part of the first image M1 and one part of the second image M2.

Subsequently, the step S106 is that: referring to FIG. 4, FIG. 5 and FIG. 6, partially covering the first image M1 by the black barrier image B for generating a right-eye image RM, and partially covering the second image M2 by the black barrier image B for generating a left-eye image LM, wherein the right-eye image RM and the left-eye image LM are concurrently generated by the field sequential color LCD Z and respectively projected onto a right eye R and a left eye L of a viewer S, thus the field sequential color LCD Z can provide 3D images for the viewer S.

More precisely, the step S108 is that: referring to FIG. 4, FIG. 5 and FIG. 6, when the field sequential color LCD Z is switched to the 2D image display mode, the light source generated by the field sequential color LCD Z concurrently passes through the first subpixels 201, the second subpixels 202 and the third subpixels 203 of the pixels 20, thus the first subpixels 201, the second subpixels 202 and the third subpixels 203 of the pixels 20 are mated with each other for generating a 2D image, thus the field sequential color LCD Z can provide 2D images for the viewer S.

Second Embodiment

Figure 7:
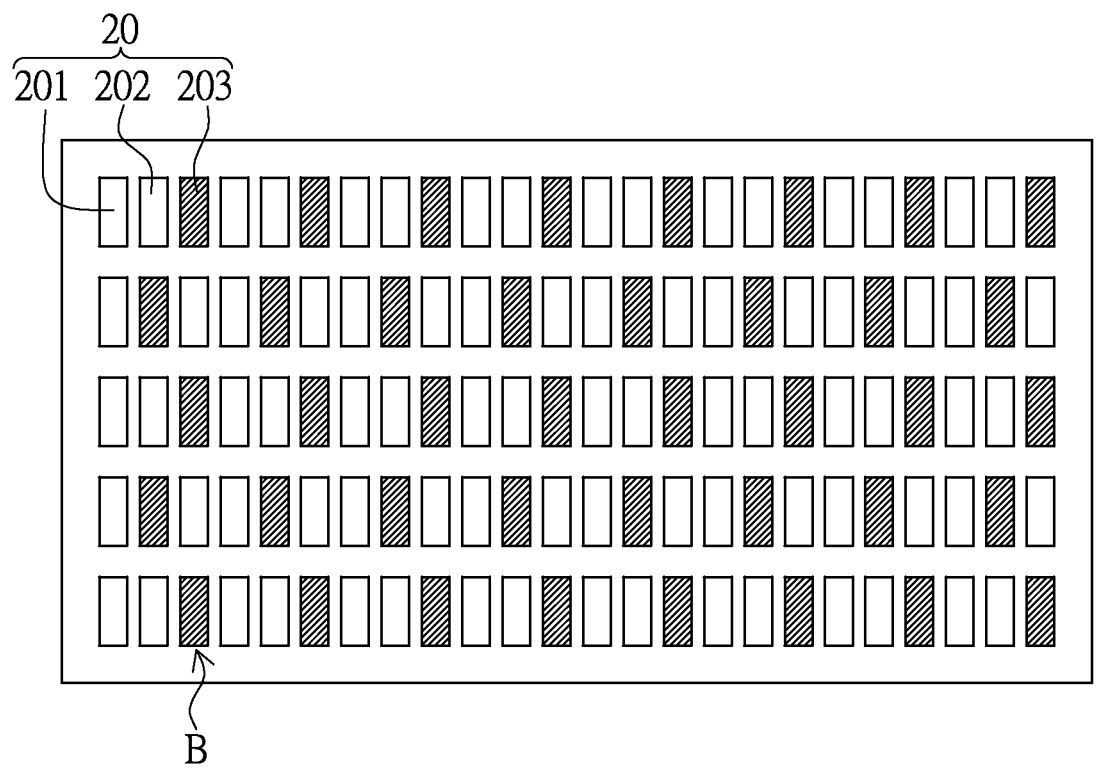
FIG. 7 shows a schematic view of the field sequential color LCD including a LCD panel having a plurality of third subpixels arranged as a black barrier image composed of many zigzag shapes according to the second embodiment of the instant disclosure.

Referring to FIG. 7, where the second embodiment of the instant disclosure provides a field sequential color LCD Z for generating 3D images by matching a software optical grating, comprising: a backlight module 1 for generating a light source and a LCD panel 2 adjacent to the backlight module 1. The LCD panel 2 includes a plurality of pixels 20 adjacent to each other and arranged as a matrix, each pixel 20 has a first subpixel 201, a second subpixel 202 and a third subpixel 203, and the first subpixel 201, the second subpixel 202 and the third subpixel 203 of each pixel 20 are arranged in sequence and adjacent to each other. Comparing FIG. 7 with FIG. 3, the difference between the second embodiment and the first embodiment is as follows: in the second embodiment, the black barrier image B can be composed of a plurality of zigzag shapes or wavy shapes, and each black barrier image B includes the second subpixel 202 or the third subpixel 203 of each pixel 20. In other words, the black barrier image B composed of many zigzag patterns is due to the dislocation relationship between the second subpixel 202 and the third subpixel 203.

Third Embodiment

Figure 8:
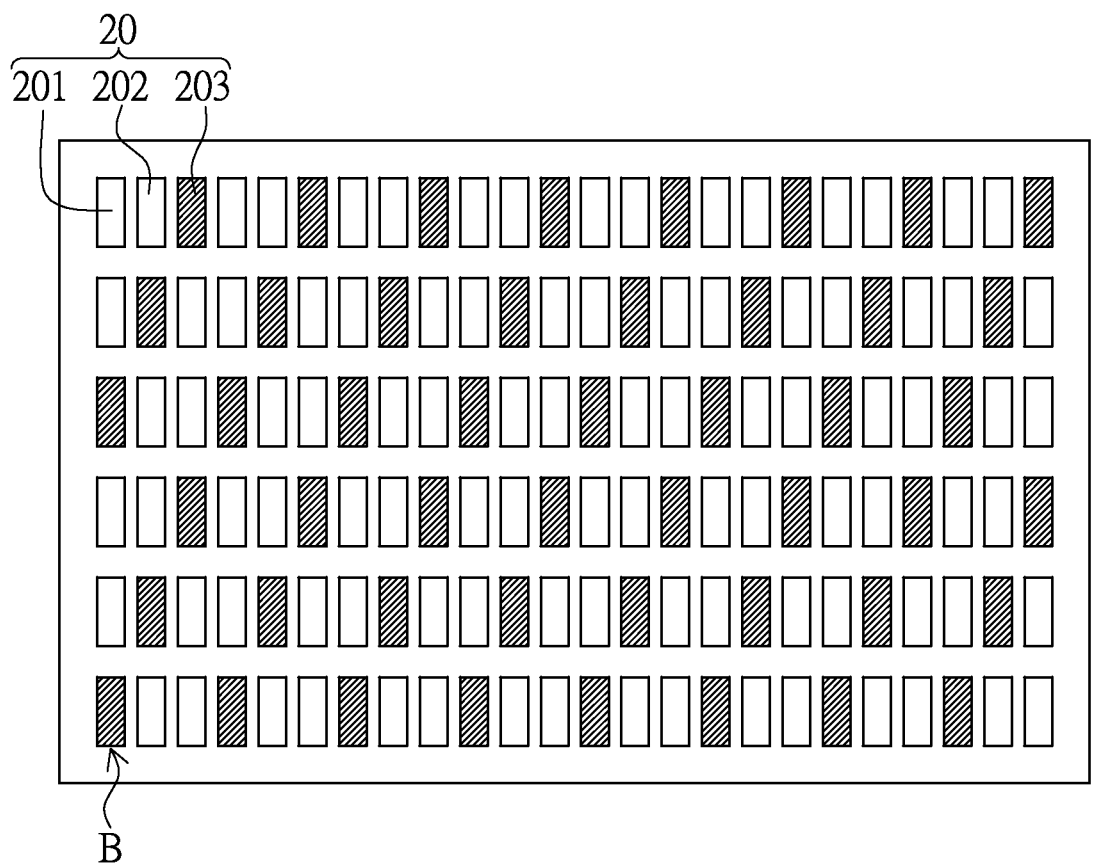
FIG. 8 shows a schematic view of the field sequential color LCD including a LCD panel having a plurality of third subpixels arranged as a black barrier image composed of many inclined shapes according to the third embodiment of the instant disclosure.

Referring to FIG. 8, where the third embodiment of the instant disclosure provides a field sequential color LCD Z for generating 3D images by matching a software optical grating, comprising: a backlight module 1 for generating a light source and a LCD panel 2 adjacent to the backlight module 1. The LCD panel 2 includes a plurality of pixels 20 adjacent to each other and arranged as a matrix, each pixel 20 has a first subpixel 201, a second subpixel 202 and a third subpixel 203, and the first subpixel 201, the second subpixel 202 and the third subpixel 203 of each pixel 20 are arranged in sequence and adjacent to each other. Comparing FIG. 8 with FIG. 3, the difference between the third embodiment and the first embodiment is as follows: in the third embodiment, the black barrier image B can be composed of a plurality of inclined shapes, and each black barrier image B includes the first subpixel 201, the second subpixel 202 and the third subpixel 203 of each pixel 20. In other words, the black barrier image B composed of many inclined patterns is due to the dislocation relationship among the first subpixel 201, the second subpixel 202 and the third subpixel 203.

In conclusion, the black barrier image B can be slightly and outwardly spread to cover one part of the first image M1 and one part of the second image M2, thus the first image M1 is covered partially by the black barrier image B for generating a right-eye image RM, and the second image M2 is covered partially by the black barrier image B for generating a left-eye image LM. Whereby, when the right-eye image RM and the left-eye image LM are concurrently generated by the field sequential color LCD Z, the right-eye image RM and the left-eye image LM can be respectively projected onto the right eye R and the left eye L of the viewer S, thus the field sequential color LCD Z can provide 3D images for the viewer S.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A field sequential color LCD for generating 3D images by matching a software optical grating, comprising:
   a backlight module for generating a light source; and
   a LCD panel adjacent to the backlight module, wherein the LCD panel includes a plurality of pixels adjacent to each other and arranged as a matrix, each pixel has a first subpixel, a second subpixel and a third subpixel, and the first subpixel, the second subpixel and the third subpixel of each pixel are arranged in sequence and adjacent to each other;
   wherein one part of the light source generated by the backlight module passes through the first subpixels of the pixels, thus the first subpixels of the pixels are mated with each other for generating a first image;
   wherein another part of the light source generated by the backlight module passes through the second subpixels of the pixels, thus the second subpixels of the pixels are mated with each other for generating a second image;
   wherein the other light source generated by the backlight module is shielded by a polarizing sheet of the LCD panel to limit the other light source to pass through the third subpixels of the pixels, thus the third subpixels of the pixels are mated with each other for generating a black barrier image as the software optical grating;
   wherein when the first image, the second image and the black barrier image are concurrently generated by the field sequential color LCD, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the field sequential color LCD and respectively projected onto a right eye and a left eye of a viewer.

2. The field sequential color LCD of claim 1, wherein the first subpixels of the pixels are arranged to form a plurality of first vertical shapes, the second subpixels of the pixels are arranged to form a plurality of second vertical shapes, the third subpixels of the pixels are arranged to form a plurality of third vertical shapes, and the black barrier image is composed of the third vertical shapes.

3. The field sequential color LCD of claim 2, wherein the first subpixel of each pixel is a leftmost subpixel of the pixel, the third subpixel of each pixel is a rightmost subpixel of the pixel, and the second subpixel of each pixel is a middle subpixel disposed between the first subpixel and the third subpixel.

4. The field sequential color LCD of claim 1, wherein the black barrier image is composed of a plurality of zigzag shapes.

5. The field sequential color LCD of claim 1, wherein the black barrier image is composed of a plurality of inclined shapes.

6. A field sequential color LCD for generating 3D images by matching a software optical grating, comprising:
   a backlight module for generating a light source; and
   a LCD panel adjacent to the backlight module, wherein the LCD panel includes a plurality of first subpixels mated with each other for generating a first image, a plurality of second subpixels, and the first subpixels, the second subpixels and the third subpixels are arranged as a matrix;
   wherein voltage is provided for the LCD panel, liquid-crystal molecules inside the LCD panel are deflected by 90 degrees, so that one part of the light source of the backlight module provided for the third subpixels of the pixels cannot pass through the polarizing sheet of the LCD panel, and then the third subpixels of the pixels is mated with each other or generating the black barrier image as the software optical grating;
   wherein when the first image, the second image and the black barrier image are concurrently generated by the field sequential color LCD, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the field sequential color LCD and respectively projected onto a right eye and a left eye of a viewer.

7. The field sequential color LCD of claim 6, wherein one part of the light source generated by the backlight module passes through the first subpixels for generating the first image, another part of the light source generated by the backlight module passes through the second subpixels for generating the second image, and the other light source generated by the backlight module is shielded by a polarizing sheet of the LCD panel to limit the other light source to pass through the third subpixels for generating the black barrier image.

8. The field sequential color LCD of claim 6, wherein the first subpixels are arranged to form a plurality of first vertical shapes, the second subpixels are arranged to form a plurality of second vertical shapes, the third subpixels are arranged to form a plurality of third vertical shapes, and the black barrier image is composed of the third vertical shapes.

9. The field sequential color LCD of claim 6, wherein the black barrier image is composed of a plurality of zigzag shapes.

10. The field sequential color LCD of claim 6, wherein the black barrier image is composed of a plurality of inclined shapes.

11. A method for generating 3D images by matching a software optical grating, comprising:
providing a field sequential color LCD including a backlight module for generating a light source and a LCD panel adjacent to the backlight module, wherein the LCD panel includes a plurality of pixels adjacent to each other and arranged as a matrix, each pixel has a first subpixel, a second subpixel and a third subpixel, and the first subpixel, the second subpixel and the third subpixel of each pixel are arranged in sequence and adjacent to each other;
switching the field sequential color LCD to a 2D image display mode or a 3D image display mode, wherein when the field sequential color LCD is switched to the 3D image display mode, one part of the light source generated by the backlight module passes through the first subpixels for generating a first image, another part of the light source generated by the backlight module passes through the second subpixels for generating the second image, and the other light source generated by the backlight module is shielded by a polarizing sheet of the LCD panel to limit the other light source to pass through the third subpixels for generating a black barrier image as the software optical grating, wherein when the first image, the second image and the black barrier image are concurrently generated by the field sequential color LCD, the black barrier image is slightly spread to cover one part of the first image and one part of the second image; and
partially covering the first image by the black barrier image for generating a right-eye image, and partially covering the second image by the black barrier image for generating a left-eye image, wherein the right-eye image and the left-eye image are concurrently generated by the field sequential color LCD and respectively projected onto a right eye and a left eye of a viewer.

12. The method of claim 11, wherein the first subpixels of the pixels are arranged to form a plurality of first vertical shapes, the second subpixels of the pixels are arranged to form a plurality of second vertical shapes, the third subpixels of the pixels are arranged to form a plurality of third vertical shapes, and the black barrier image is composed of the third vertical shapes.

13. The method of claim 12, wherein the first subpixel of each pixel is a leftmost subpixel of the pixel, the third subpixel of each pixel is a rightmost subpixel of the pixel, and the second subpixel of each pixel is a middle subpixel disposed between the first subpixel and the third subpixel.

14. The method of claim 11, wherein the black barrier image is composed of a plurality of zigzag shapes.

15. The method of claim 11, wherein the black barrier image is composed of a plurality of inclined shapes.

16. The method of claim 11, wherein when the field sequential color LCD is switched to the 2D image display mode, the light source generated by the field sequential color LCD concurrently passes through the first subpixels, the second subpixels and the third subpixels, thus the first subpixels, the second subpixels and the third subpixels are mated with each other for generating a 2D image.

* * * * *